United States Patent [19]

Ward et al.

[11] Patent Number: 5,218,433
[45] Date of Patent: Jun. 8, 1993

[54] REAL TIME SCANNING DEVICE SIGNAL PROCESSING CIRCUIT INCLUDING COLOR SIGNAL AND BLANKING SIGNAL GENERATING CIRCUITS

[75] Inventors: John V. Ward, Croydon; Robert C. McNamee, Upwey, both of Australia

[73] Assignee: Commonwealth Scientific & Industrial Research Organisation, Campbell, Australia

[21] Appl. No.: 646,756
[22] PCT Filed: Jul. 7, 1989
[86] PCT No.: PCT/AU89/00294
§ 371 Date: Mar. 8, 1991
§ 102(e) Date: Mar. 8, 1991
[87] PCT Pub. No.: WO90/00849
PCT Pub. Date: Jan. 25, 1990

[30] Foreign Application Priority Data
Jul. 8, 1988 [AU] Australia .............................. 9209/88

[51] Int. Cl.[5] ............................................. H04N 9/68
[52] U.S. Cl. ........................................ 358/28; 358/17; 358/41; 358/33
[58] Field of Search ....................... 358/17, 27, 28, 29, 358/30, 33, 41

[56] References Cited

U.S. PATENT DOCUMENTS

| | | | |
|---|---|---|---|
| 3,558,806 | 1/1971 | Monahan et al. | 358/30 |
| 3,588,827 | 6/1971 | Van Roessel | 358/30 |
| 4,160,264 | 7/1979 | Hailey et al. | 258/29 |
| 4,176,373 | 11/1979 | Dillon et al. | 358/41 |
| 4,196,474 | 4/1980 | Buchanan | 364/461 |
| 4,232,340 | 11/1980 | Fuhrer | 358/36 |
| 4,272,785 | 6/1981 | Fuhrer | 358/21 R |
| 4,330,792 | 5/1982 | Naimpally | 358/33 |
| 4,473,839 | 9/1984 | Noda | 358/41 |
| 4,475,161 | 10/1984 | Stock | 358/16 |
| 4,494,137 | 1/1985 | Freyberger | 358/33 |
| 4,506,291 | 3/1985 | Lewis, Jr. | 358/33 |
| 4,511,915 | 4/1985 | Van der Valk et al. | 358/17 |
| 4,630,103 | 12/1986 | Yamanaka | 358/30 |
| 4,639,769 | 1/1987 | Fleischer et al. | 358/27 |
| 4,688,083 | 8/1987 | Hess | 358/30 |
| 4,707,727 | 11/1987 | Penney | 358/30 |
| 4,851,900 | 7/1989 | Edwards et al. | 358/93 |
| 4,875,091 | 10/1989 | Yamada et al. | 358/30 |
| 5,038,204 | 8/1991 | Wan et al. | 358/29 |

FOREIGN PATENT DOCUMENTS

WO83/00921 3/1983 Australia .
2144292A 2/1985 United Kingdom .

Primary Examiner—James J. Groody
Assistant Examiner—Jeffrey S. Murrell
Attorney, Agent, or Firm—Arnold, White & Durkee

[57] ABSTRACT

A real-time signal processing circuit includes circuitry for receiving input signals generated by a scanning device, and circuitry for obtaining a synchronizing signal and a first blanking signal from the receiving circuitry. The signal-processing circuit has an input stage and a processing stage which selectively generates color output signals from the input signals, each color output signal being derived from one or a combination of the input signals. The circuit also has an output stage for including a blanking output signal in the color output signals in response to the first blanking signal and outputting the color signals and the synchronizing signal.

23 Claims, 5 Drawing Sheets

REAL TIME SCANNING DEVICE SIGNAL PROCESSING CIRCUIT INCLUDING COLOR SIGNAL AND BLANKING SIGNAL GENERATING CIRCUITS

FIELD OF THE INVENTION

The present invention relates to a real-time signal processing circuit which is particularly, but not exclusively, adapted for processing signals received from a scanning device so as to produce signals for driving a colour monitor.

BACKGROUND OF THE INVENTION

A scanning device, such as a scanning electron microscope or a television camera, on scanning an object produces a number of signals which relate to characteristics of the object, together with synchronising and blanking signals. The synchronising signals are issued at the beginning of each line scanned and the blanking signals issue at the end of each line scanned. Vertical synchronising and blanking signals issue at the beginning and end, respectively, of each field scanned. The scan which the scanning device performs is known as a raster scan. In particular, with respect to a scanning electron microscope, signals can be generated by detectors relating to the detection of secondary electrons generated from the scanned object and backscattered electrons both pursuant to the incidence of a scanning beam of the electron microscope on the surface of the object. As discussed in the specification of Australian Patent No. 549,193 it is desirable to provide means which processes, in real-time, the signals produced by the detectors of a scanning electron microscope so that the processed signals may be used in directly driving a colour monitor. Thus characteristics of the scanned object at a particular location thereon can be rapidly determined using the display produced on the colour monitor by the processed signals, which are representative of the characteristics. Also it is desirable to provide real-time processing means which enables the signals used to drive the colour monitor to each be derived from one or more of the signals generated by a scanning device.

SUMMARY OF THE INVENTION

In accordance with the present invention there is provided a real-time signal processing circuit comprising:
means for receiving input signals generated by a scanning device;
means for obtaining a synchronising signal and a first blanking signal from said receiving means;
means for selectively generating colour output signals from said input signals, each colour output signal being derived from one or a combination of said input signals; and
means for including a blanking output signal in said colour output signals in response to said first blanking signal and outputting said colour output signals and said synchronising signal.

Preferably the said circuit includes means for respectively adjusting the level of said colour output signals.

Preferably said adjusting means is adapted to alter the DC voltage level of said colour output signals. Preferably said adjusting means is also adapted to separately adjust a gain applied to said colour output signals.

Preferably said input signals include characterising signals which represent respective characteristics of a scanned subject and each colour output signal includes a selected percentage of said characterising signals and also preferably said inverted characterising signals.

Preferably said generating means includes means for inverting said characterising signals and varying the gain of the characterising signals and of the inverted characterising signals.

Preferably said generating means is adapted such that said selected percentage is variable with respect to each colour output signal.

Preferably said obtaining means includes sync separator means for generating said synchronising signal from said input signals and blanking generator means for generating said first blanking signal from said synchronising signal.

The obtaining means may include means for delaying the synchronising signal by a first predetermined period of time which is equivalent to the period of time which the characterising signals are delayed by the signal processing circuit before being outputted in a representative form as the colour output signals.

The obtaining means may also include means for delaying the first blanking signal by a second predetermined period of time which is equivalent to the period of time which the characterising signals are delayed before being inputted in a representative form as the colour output signals to said blanking signal including means.

Preferably said blanking output signal is said first blanking signal.

Preferably said scanning device is a scanning electron microscope.

Preferably said colour output signals and said synchronising signals are outputted to a colour monitor which includes RGB inputs to which the colour output signals are applied, respectively.

BRIEF DESCRIPTION OF THE DRAWINGS

Preferred embodiments of the present invention will now be described, by way of example only, with reference to the accompanying drawings, in which.

DETAILED DESCRIPTION OF A SPECIFIC EMBODIMENT OF THE INVENTION

Figure 1:
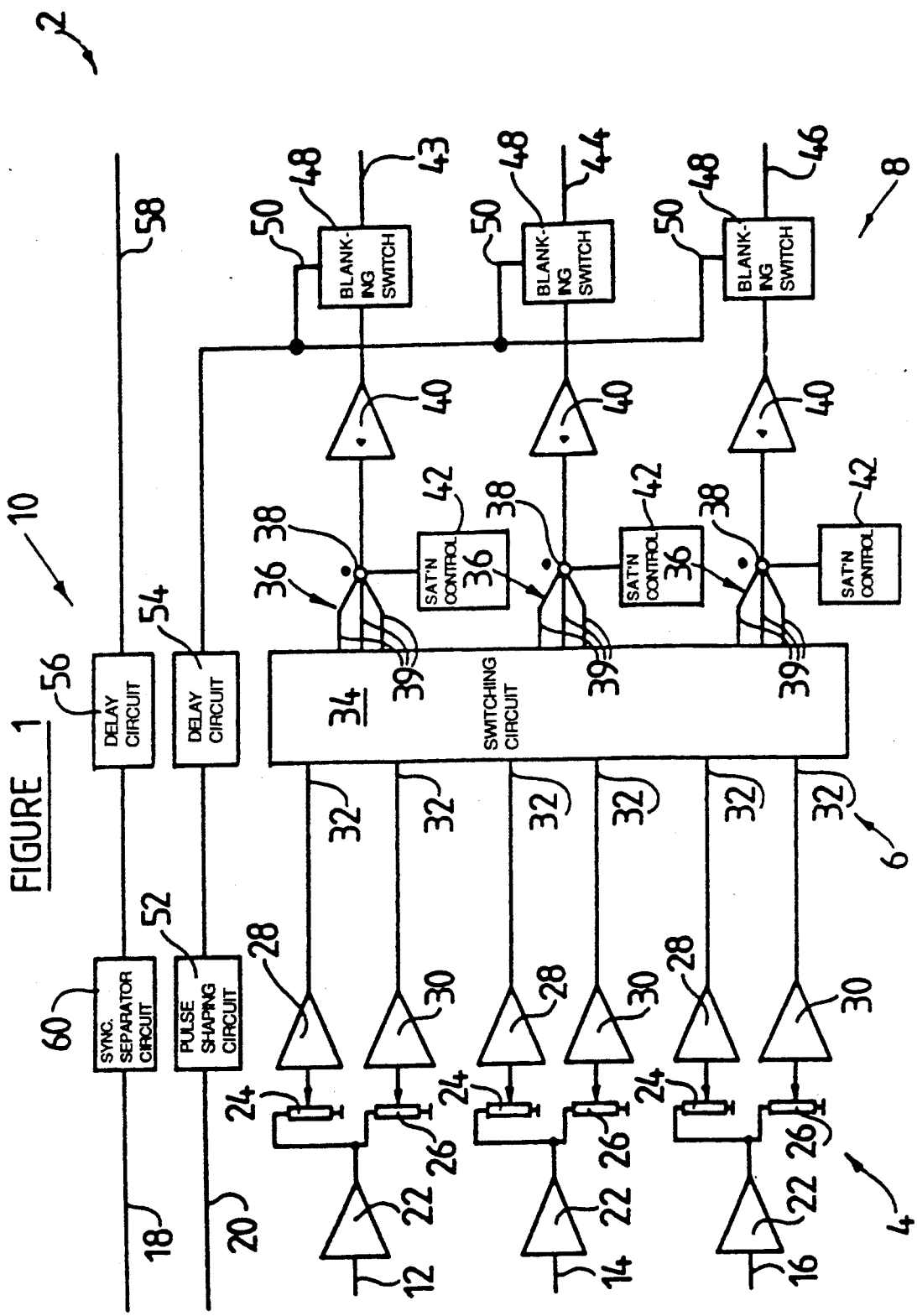
FIG. 1 is a block diagram of a first preferred embodiment of a signal processing circuit.

A real-time signal processing circuit 2, as shown in FIG. 1, comprises an input stage 4, a processing stage 6, an output stage 8 and a synchronising and blanking processing stage 10. At the input stage 4 provision is made for receiving up to three different characterising signals on input lines 12, 14 and 16 and for receiving a signal from which a synchronising signal may be extracted on a synchronising input line 18 and a blanking signal on a blanking input line 20. The signals received on the input lines 12, 14, 16, 18 and 20 are to be obtained from the outputs of a scanning device pursuant to the scanning of a subject thereby. The characterising signals received on the input lines 12, 14 and 16 would each represent characteristics of the scanned subject. On being inputted on the lines 12, 14 and 16 the signals are buffered by respective unity gain amplifiers 22 and are outputted so as to appear across two respective low impedance potentiometers 24 and 26. Each amplifier 22 has sufficient output power so as to drive a respective pair of potentiometers 24 and 26, which are connected in parallel and each has one terminal connected to a respective output of an amplifier 22 whilst another terminal is connected to ground. The wipers of the potentiometers 24 and 26 are each connected to the input of an amplifier, the wiper of one potentiometer 24 of each pair being connected to a respective non-inverting amplifier 28 and the wiper of the other potentiometer 26 of the pair being connected to a respective inverting amplifier 30. The output of each amplifier 2B and 30 is connected to a respective input 32 of a switching circuit 34. The potentiometers 24 and 26 may be adjusted as desired and are used to control the voltage levels of the signals received on the input lines 12, 14 and 16 before being inputted to the amplifiers 28 and 30. The amplifiers 28 and 30 amplify the attenuated signals received from the potentiometers 24 and 26 according to gains which are preset as desired. The potentiometers 24 and 26 may be adjusted independently with respect to one another, and similarly, the gains of the amplifiers 28 and 30 may be adjusted independently with respect to one another. Hence, the input stage 4 provides inverted and non-inverted forms of the signals inputted on the lines 12, 14 and 16, the voltage levels of which are adjusted as desired, at respective inputs 32 of the switching circuit 34.

The switching circuit 34 has three sets 36 of output lines which terminate at a respective summing node 38. Each set 36 comprises three output lines 39. The three summing nodes 38 are each connected to an input of a unity gain amplifier 40. The processing stage 6 is configured so as to enable a user of the processing circuit 2 to output any one of the signals received on the inputs 32 to a selected output line 39. Each node 38 may therefore have one, two or three of the signals received on the inputs 32 incident thereon, and any signals received at summing node 38 are added on being inputted to the respective amplifier 40. For example, the signal received on the input line 12 may be outputted unchanged on one output line 39 to a summing node 38, an inverted form of the signal received on line 14 may be outputted to another summing node 38 and the signal received on line 14 and the signal received on line 16 may both be outputted to a third summing node 38 so as to combine the signals. Alternatively, the three signals received on the lines 12, 14 and 16 may be added together at one summing node 38, the inverted forms of the signals may be added together at another summing node 38 and one of the signals may be outputted to the third summing node 38. The switching circuit 34 may be constructed in a number of ways, one of which would be to employ an array of multiplexers which enable the input lines 32 to be selectively switched to the sets 36 of output lines 39 as described above. Connected to each summing node 38 is also the output of a respective saturation control circuit 42. The saturation control circuits 42 are configured so as to apply a DC offset voltage, as required, to the summing node 38 so as to adjust the DC level of the signal inputted to the amplifiers 40. As the signals applied to the inputs of the three amplifiers 40 are eventually used to drive the RGB inputs of a colour monitor, the saturation control circuits 42 provide the user of the circuit 2 with a means for adjusting the saturation intensity of each primary colour displayed on the monitor, the intensity of the colours being determined by the three signals applied to the RGB inputs.

The outputs of the amplifiers 40 are each connected to an output line 43, 44 and 46, respectively, via a blanking switch 48. The output lines 43, 44 and 46 are connected, in use, to the Red, Green, and Blue inputs, respectively, of an RGB colour monitor. The blanking switches 48 each apply a blanking signal to the signals outputted from the amplifiers 40 by placing the output lines 43, 44 and 46 connected thereto in a low state for a predetermined period of time in response to a further blanking signal received on the inputs 50 of the blanking switches 48. The further blanking signal is derived from the blanking signal inputted on the blanking input line 20. The Signal received on the line 20 is first inputted to a pulse shaping circuit 52 which removes unwanted transients and improves distinction between the high and low states of the signal inputted thereto. The output of the pulse shaping circuit 52 is then applied to a delay circuit 54, which delays the signal received on the line 20 by a predetermined period of time. The predetermined period of time corresponds to the delay incurred by the signals received on the input lines 12, 14 and 16 in being processed by the input and processing stages 4 and 6 before being outputted to the blanking switches 48 in a representative form, according to the processing affected by the input and processing stages 4 and 6. This ensures that the blanking signal received at the inputs 50 remains in synchronism with the characterising signals after they have been processed by the input stage 4, the processing stage 6 and the output amplifiers 40 and inputted to the switches 48, and allows the characterising signals to be directly outputted in a representative form as colour output signals on the output lines 43, 44 and 46 so as to drive the RGB inputs of a colour monitor, thereby enabling the processing circuit 2 to perform as a real-time processor. Similarly, the synchronising signal received on the synchronising input 18 is delayed by a second predetermined period of time by a second delay circuit 56 before being outputted to a synchronising input of the colour monitor on a synchronising output line 58. This ensures that the synchronising signal remains in synchronism with the characterising signals outputted in a representative form on output lines 43, 44 and 46. The second predetermined period of time by which the synchronising signal is delayed corresponds to the delay which is incurred by the characterising signals received on the input 12, 14 and 16 in being processed by the input, processing and output stages 4, 6 and 8 before being outputted as the representative colour output signals. As the synchronising signal received on the synchronising input line 18 may also include video information, the signal is applied first to a sync separator circuit 60 which removes the video information and outputs only a synchronising signal to the second delay circuit 56.

The signal processing circuit 2 is particularly advantageous for use with a scanning electron microscope. In one mode of use one input line 12 is connected to the output of a broad energy band electron detector and another input line 14 is connected to a backscattered electron detector. The broad energy band detector detects predominantly secondary electrons and backscattered electrons emitted from a scanned subject. The input and output stages 4 and 6 are then set so that the broad energy band electron signal is applied directly to the Red output line 43, the backscattered electron signal is applied directly to the Green output line 44 and a signal produced by subtracting the backscattered electron signal from the broad energy band electron signal is outputted on the Blue output line 46. This provides the user viewing t he colour monitor with a display which enables the user to instantaneously differentiate between the areas of secondary and backscattered electron emission from a scanned subject. Distinguishing between the areas is facilitated by applying the difference signal, which is representative of secondary electron emission from the scanned subject, to the Blue input of the colour monitor. The display may then be adjusted as desired by adjusting the saturation control circuits 42 so as to alter the dominance of particular colours or altering the potentiometers 24 and 26 or amplifiers 28 and 30 of the input stage 4 so as to adjust the level of the inputted signals. This enables particular characteristics or elements of the scanned subject, as represented by respective colours, to be highlighted on the display. Another mode of use would involve connecting one of the input lines 12 to a detector of the microscope which detects electrons in a broad energy band, a second input line 14 to a detector which detects backscattered electrons and a third input line 16 to a detector which detects electrons in a high energy band, which falls within the broad energy band, and then passing the signals directly to the Red, Green and Blue output lines 43, 44, and 46, respectively.

Figure 2:
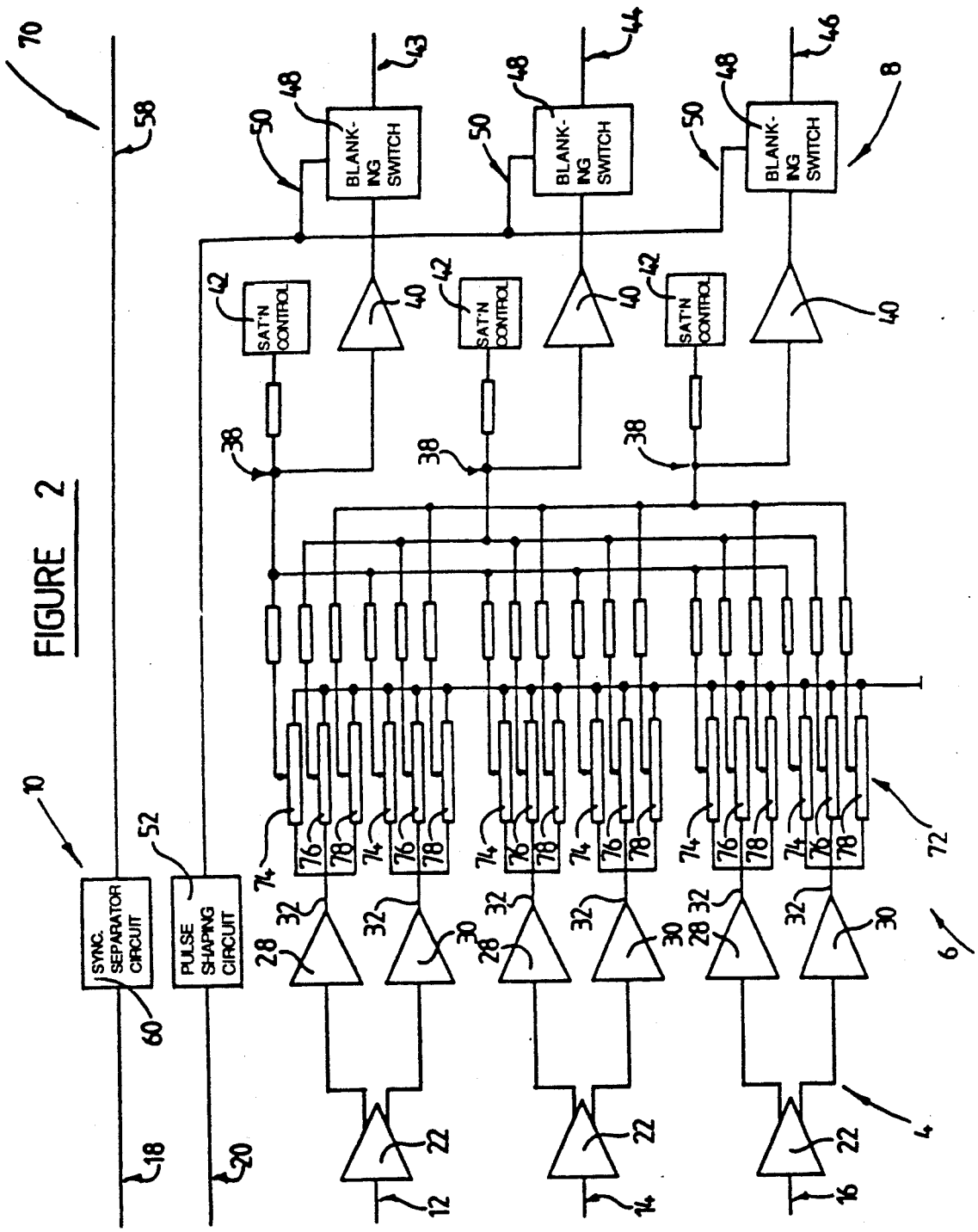
FIG. 2 is a block diagram of a second preferred embodiment of a signal processing circuit.

A real-time signal processing circuit; 70, as shown in FIG. 2, performs the same function as the previously described processing circuit 2 but enables more flexibility with respect to determining the contribution of a signal inputted on one of the input lines 12, 14 or 16 in forming a colour output signal. The switching circuit 34 of the processing stage 6 is replaced by a potentiometer array 72 and the potentiometers 24 and 26 of the input stage 4 are removed so that each output of the input amplifiers 22 is connected directly to the respective non-inverting amplifier 28 and inverting amplifier 30. The outputs 32 of the amplifiers 28 and 30 are each connected to three low impedance potentiometers 74, 76 and 78. The potentiometers 74, 76 and 78 are connected in parallel between each respective output 32 and ground. The wipers of the first potentiometers 74 are connected via resistors to one summing node 38, and similiarly, the wipers of the second potentiometers 76 are connected to a second summing node 38 and the wipers of the third potentiometers 78 are connected to a third summing node 38. The signals on each of the outputs 32 can therefore be applied to a summing node 38 and the contribution which one of the signals makes to forming a respective colour output signal is determined by the position of the wiper of the potentiometer 74, 76 or 78 connected to the node 38 and the output line 32 of the signal. Thus, the percentage contribution of the signals on the outputs 32 can be varied for each summing node 38. This is distinct from the processing circuit 2 of FIG. 1 where the outputs 32 can only be selectively switched to the summing nodes 38.

The processing circuit 70 also does not require the use of the delay circuits 56 and 54. The delay signals experience in passing through the input, processing and output stages 4, 6 and 8 is reduced to approximately 20 ns by using high frequency, high slew rate operational amplifiers for each of the amplifiers 22, 28, 30 and 40 in the circuit 70. The input buffer amplifiers 22 are LM733H amplifiers, the amplifiers 28 and 30 connected to the potentiometer array 72 and the output amplifiers 40 are LH0032 amplifiers The blanking switches 48 are 74HC4066 cmos analog switches. The delay induced in the colour output signals with respect to the synchronising signal on line 58 and the blanking signal on the input 50 produces an offset in the picture generated on the RGB monitor, but the offset is virtually unnoticeable and does not seriously degrade the quality of the picture.

Figure 3:
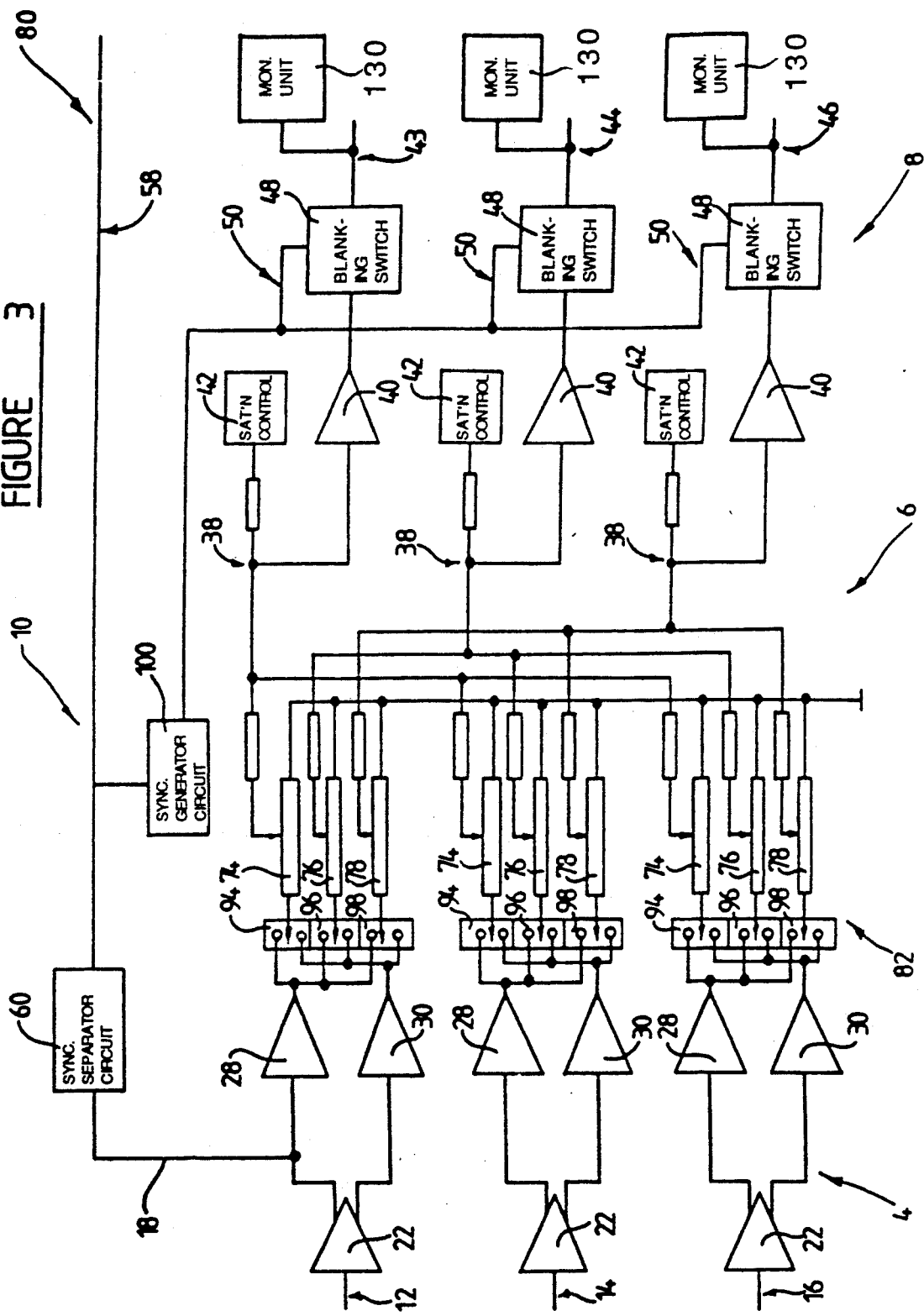
FIG. 3 is a block diagram of a third preferred embodiment of a signal processing circuit.

A further real-time signal processing circuit 80, as shown in FIG. 3, performs essentially the same function as and has similar components to the previously described signal processing circuits 2 and 70, however, the circuit 80 includes a potentiometer array 82 having a reduced number of potentiometers, and derives the synchronising output signal and the blanking signal inputted to the switches 48 in a different manner. The circuit 80 also includes means for monitoring and adjusting the signal level of the output signals on the output lines 43, 44 and 46.

The number of potentiometers 74, 76 and 78 employed in the array 82 is half the number of potentiometers 74, 76 and 78 employed in the array 72 illustrated in FIG. 2. As a user obtains minimal advantage from applying an inverted version of one of the input signals together with a non-inverted version of the same input signal to a summing node 38, a single potentiometer 74, 76 or 78 is provided to couple a respective input signal to a respective summing node 38. A switch 94, 96 or 98 is included to selectively connect the potentiometer 74, 76, or 78 to the output of the respective non-inverting amplifier 28 or the respective inverting amplifier 30 associated with the input signal. The first potentiometers 74 connected to the first summing node 38 all have respective first switches 94 connected to a first terminal thereof and the other terminal of the potentiometers 74 is connected to ground. The first switches 94 have two switching contacts connected respectively to the outputs of respective non-inverting and inverting amplifiers 28 and 30 and the first terminals of the potentiometers 74 may be switched between the contacts. Similarly, the second and third potentiometers 76 and 78 are connected to respective second and third switches 96 and 98 which each have two switching contacts connected respectively to respective non-inverting and inverting amplifiers 28 and 30, as shown in FIG. 3. Thus if an inverted version of the first input signal applied to the first input line 12 is to be passed to the second summing node 38, the second switch 96 associated with the first input line 12 is switched so as to connect the respective second potentiometer 76 to the output of the inverting amplifier 30 which receives the first input signal. The wiper of the second potentiometer 76 may then be adjusted to select the level of the inverted input signal which is to be applied to the second summing node 38.

The signal processing circuit 80 does not require a blanking input on line 20 or an externally derived synchronising input on line 18 in order to derive the synchronising output signal and the blanking signal applied to the blanking switches 48. This is particularly advantageous as most scanning devices, such as scanning electron microscopes, do not provide easily accessible blanking and synchronising outputs on the housing of the devices. A blanking input signal, in particular, normally has to be obtained by dismantling the scanning device and locating an appropriate contact node in the electrical hardware of the device.

In the signal processing circuit 80 the input line 18 of the sync separator is connected to the output of the buffer amplifier 22 connected to the first input line 12. The sync separator 60 of the processing circuit 80 is configured to remove the video information from a composite video signal received on input line 18 and retain only the synchronising signal included in the composite video signal. The synchronising signal is then outputted on the synchronising output line 58. All that is required is to ensure a composite video signal is applied to the first input line 12.

Figure 4:
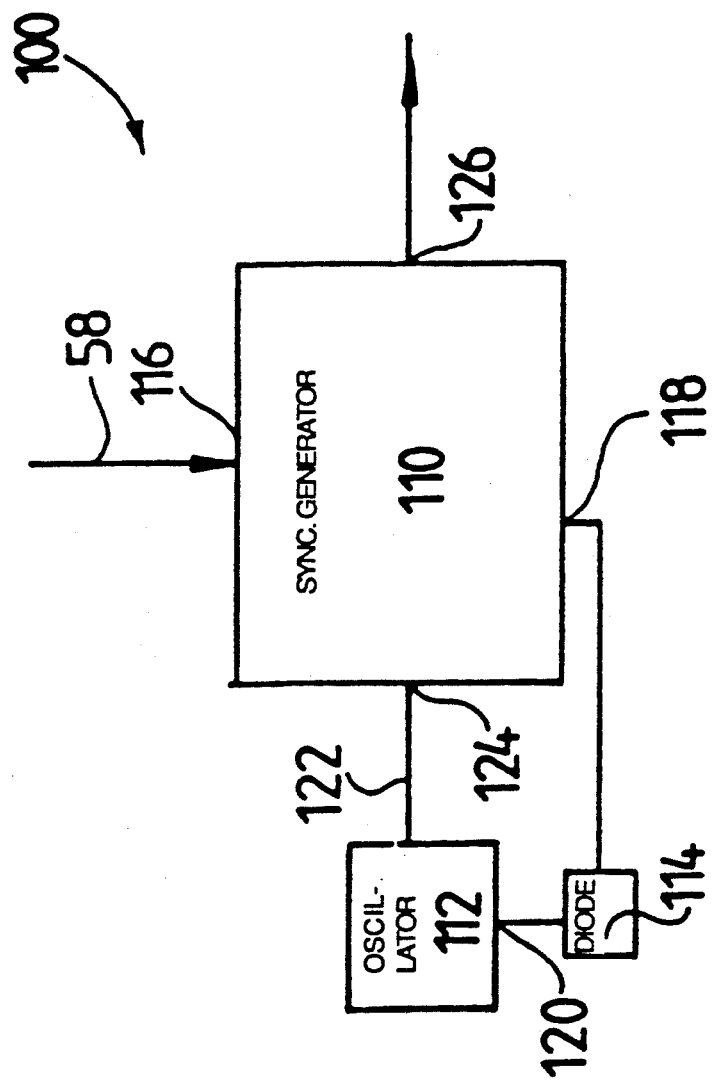
FIG. 4 is a block diagram of a sync generator circuit of the processing circuit.

The blanking signal to be applied to the inputs 50 of the blanking switches 48 is generated by a sync generator circuit 100 connected between the synchronising output line 58 and the inputs 50. The generator circuit 100, as shown in FIG. 4, includes a SAA1043 universal sync generator chip 110, marketed by Philips Industries Ltd, an oscillator 112 and a Varactor diode 114. The synchronising signal outputted on line 58 by the sync separator 60 is inputted to the chip 110 at an external composite sync input 116 of the chip 110. In response to the synchronising signal the chip 110 adjusts the level of a DC signal outputted on a phase detector output 118 of the chip 110. The DC signal is applied to the Varactor diode 114, which in turn adjusts the level of a DC signal applied to a timing input 120 of the oscillator 112. The oscillator 112 has an output line 122 which is connected to an oscillator input of the chip 110. The frequency of the signal outputted on the oscillator output 122 is determined by the level of the signal inputted to the timing input 120. The frequency of the outputted signal governs the timing of the chip 110 and consequently governs the timing of the blanking signal outputted on a composite blanking output 126 of the chip 110. The blanking output 126 is connected to the inputs 50 of the blanking switches 48. The oscillator 112 is therefore locked to the synchronising signal inputted on line 58 and, accordingly, the timing for generation of appropriate vertical and horizontal blanking signals on the blanking output 126 is determined on the basis of the synchronising signal. Preferably the oscillator 112 is locked to the frequency of the horizontal synchronising pulses of the synchronising signal.

The chip 110 is adapted to monitor and count the vertical and horizontal synchronising pulses received on the input 116 to determine the type of blanking pulses to be placed on the blanking output 126. By counting these synchronising pulses and monitoring the period therebetween the chip 110 is able to determine whether the synchronising pulses relate to an odd or even field of a raster scan and adjust the blanking pulses outputted accordingly.

The signal processing circuit 80 further includes three monitoring units 130 which are connected respectively to the output lines 43, 44 and 46. The monitoring units 130 monitor the level of the output signals on the lines 43, 44, and 46 and provide a display which is representative of the levels of each signal to a user. The amplifiers 40 connected between the summing nodes 38 and the blanking switches 48 are provided with adjustable gains so that a user may view the display, or displays, and adjust the levels of the output signals by adjusting the gain of the respective output amplifier 40. It is particularly desirable to ensure the level of each output signal is maintained below a predetermined threshold level when the output lines 43, 44 and 46 are connected to the RGB inputs of a PAL encoder. If the level of an output signal exceeds the threshold level the colour of the picture produced by the output of the encoder will be distorted.

Figure 5:
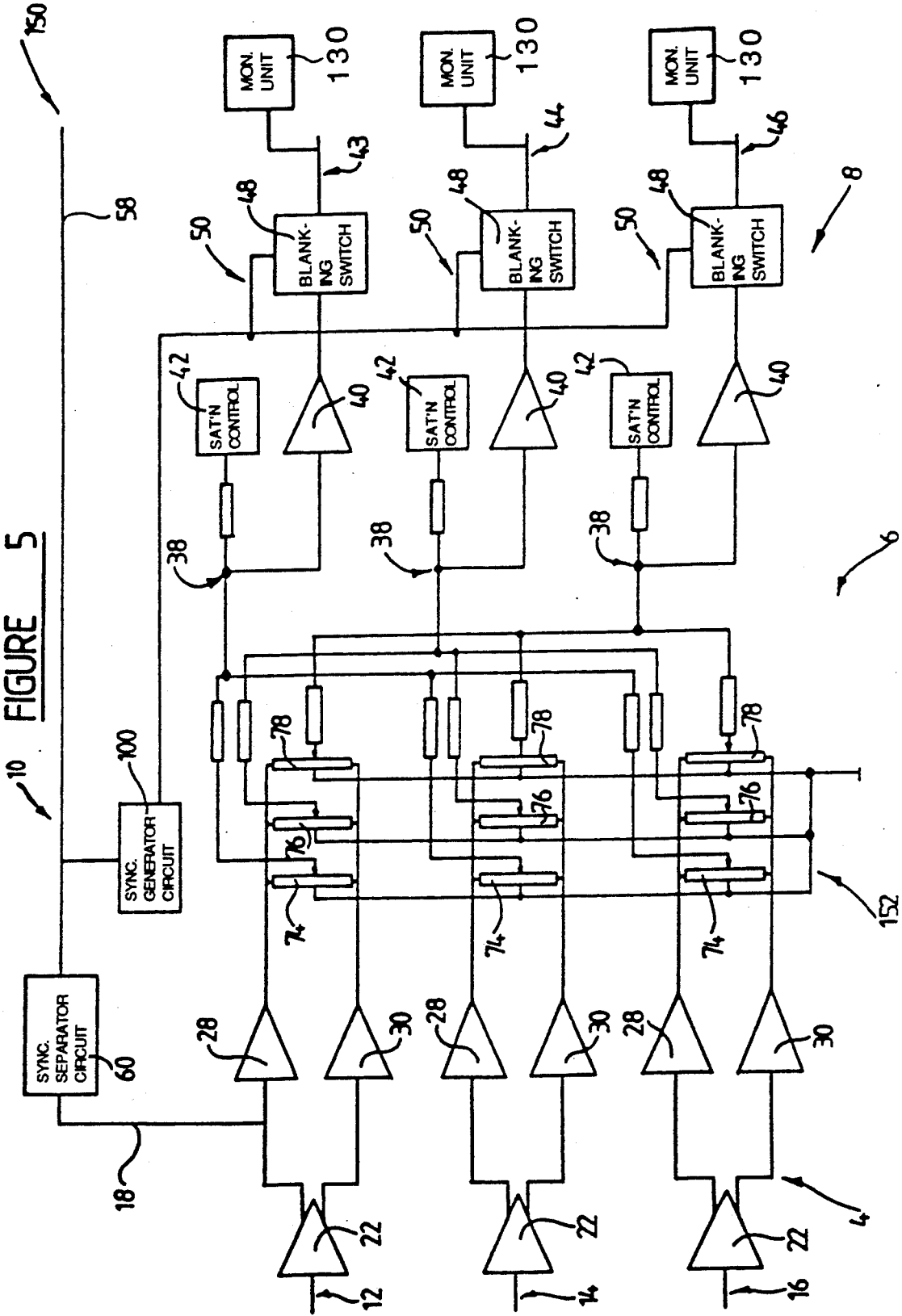
FIG. 5 is a block diagram of a fourth preferred embodiment of a signal processing circuit.

A fourth real-time signal processing circuit 150, as shown in FIG. 5, is the same as the third signal processing circuit 80 described above except the fourth circuit 150 includes a different potentiometer array 152. The array 152 does not require the use of the switches 94, 96 and 98 as the potentiometers 74, 76 and 78 are centre-tapped potentiometers, i.e. the centre of the resistor of each potentiometer 74, 76, and 78 is connected to ground. The outputs of each pair of non-inverting and inverting amplifiers 28 and 30 have three respective potentiometers 74, 76 and 78 connected therebetween. The wipers of each potentiometer 74, 76, and 78 are therefore able to move between a positive and negative range of levels of the signal inputted to the respective input line 12, 14 or 16 associated therewith.

The input stages 4 of the second, third and fourth processing circuits 70, 80, and 150 have been described as including a non-inverting buffer amplifier 22 for each input line 12, 14 and 16 having its output connected to respective non-inverting and inverting amplifiers 28 and 30, which provide non-inverted and inverted versions of the respective input signal. An alternative approach is to configure the buffer amplifiers 22 so they provide an inverted and a non-inverted output in respect of each input signal. The inverted and non-inverted outputs are then applied to the potentiometer arrays 72, 82 and 152 via non-inverting amplifiers 28 and 30, which are preferably LH0002 amplifiers.

While all of the signal processing circuits 2, 70, 80 and 150 are particularly useful for processing the signals generated by a scanning electron microscope and television cameras, the processing circuits may be used for processing any video or colour signals which have been generated by a raster scan. For example, a video signal may be stored digitally in a digital memory circuit, outputted to a digital to analog converter and applied to one of the processing circuits.

We claim:

1. A real-time signal processing circuit comprising:
   means for receiving input signals generated by a scanning device, said input signals including characterizing signals which represent respective characteristics of a scanned subject;
   means for obtaining a synchronizing signal and a first blanking signal from said receiving means;
   means for selectively generating color output signals from said characterizing signals, each color output signal being derived from at least one of said characterizing signals and including a selected percentage of said characterizing signals; and
   means for including a blanking output signal in said color output signals in response to said first blanking signal;
   and means for outputting said color output signals and said synchronizing signal.

2. A processing circuit as claimed in claim 1, wherein said generating means includes means for inverting said characterizing signals and varying the gain of the characterizing signals and of the inverted characterizing signals.

3. A processing circuit as claimed in claim 2, wherein each color output signal includes a selected percentage of said characterizing signals and said inverted characterizing signals.

4. A processing circuit as claimed in claim 3, wherein said generating means is adapted such that said selected percentage is variable with respect to each color output signal.

5. A processing circuit as claimed in claim 4, wherein said inverting and varying means includes a plurality of non-inverting and inverting amplifier stages each adapted to receive a respective one of said characterizing signals, and a potentiometer array connected to said stages, and having a plurality of potentiometers, for each non-inverting and inverting amplifier stage, adapted to receive and adjust the percentage of the respective characterizing signal and/or inverted characterizing signal outputting by the non-inverting and inverting amplifier stage, each one of said potentiometers being connected to a respective one of a plurality of summing nodes, said color output signals thereby appearing, in use, at same summing nodes.

6. A processing circuit as claimed in claim 5, wherein said obtaining means includes sync separator means for generating said synchronizing signal from said input signals and blanking generator means for generating said first blanking signal from said synchronizing signal.

7. A processing circuit as claimed in claim 6, wherein timing of said blanking generator means is locked to said synchronizing signal.

8. A processing circuit as claimed in claim 5, wherein said obtaining means includes means for delaying the synchronizing signal by a first predetermined period of time which is equivalent to the period of time which the characterizing signals are delayed by the signal processing circuit before being outputted in a representative form as the color output signals.

9. A processing circuit as claimed in claim 8, wherein said obtaining means includes means for delaying the first blanking signal by a second predetermined period of time which is equivalent to the period of time which the characterizing signals are delayed before being inputted in a representative form as the color output signals to said blanking signal including means.

10. A processing circuit as claimed in any one of claims 1 to 9, wherein said input signals include a blanking input signal and said obtaining means includes means for pulse shaping said blanking input signal to generate said fist blanking signal.

11. A processing circuit as claimed in any one of claims 1 to 9, further comprising means for respectively adjusting the level of said color output signals.

12. A processing circuit as claimed in claim 11, wherein said adjusting means is adapted to alter the DC voltage level of said color output signals.

13. A processing circuit as claimed in claim 11, wherein said adjusting means is adapted to adjust a gain applied to said color output signals.

14. A processing circuit as claimed in any one of claims 1,2 to 9, 12 or 13, wherein said blanking output signal is said first blanking signal.

15. A processing circuit as claimed in any one of claims 1,2 to 9, 12 or 13, wherein said blanking signal including means comprises blanking switch means which switches output lines between said color output signal and a low state in response to said first blanking signal.

16. A processing circuit as claimed in claim 15, wherein said blanking output signal is said first blanking signal.

17. A processing circuit as claimed in any one of claims 1, 2 to 9, 12 or 13, wherein said scanning device is a scanning electron microscope.

18. A processing circuit as claimed in claim 16, herein said blanking output signal is said first blanking signal.

19. A processing circuit as claimed in any one of claims 1, 2 to 9, 12 or 13, wherein said color output signals and said synchronizing signals are outputted to a color monitor which includes RGB input to which the color output signals are applied, respectively.

20. A processing circuit as claimed in claim 19, wherein said blanking output signal is said first blanking signal.

21. A real-time signal processing circuit comprising:
means for receiving input signals generated by a scanning device, said input signals including characterizing signals which represent respective characteristics of a scanned subject;
means for selectively generating color output signals from said characterizing signals, each color output signal being derived from at least one of said characterizing signals and including a selected percentage of said characterizing signals; and
means for deriving a blanking signal and a synchronizing signal from the input signals, including the blanking signal in the color output signals, and outputting the color output signals and the synchronizing signal.

22. A real-time signal processing circuit as claimed in claim 1 or 21 wherein said including means includes said synchronizing signals in said color output signals.

23. A real-time signal processing circuit as claimed in claim 22, having video processing means for processing said color output signals and outputting the color output signals as a color video signal.

* * * * *

UNITED STATES PATENT AND TRADEMARK OFFICE
CERTIFICATE OF CORRECTION

PATENT NO. : 5,218,433
DATED : June 8, 1993
INVENTOR(S) : Ward et al

It is certified that error appears in the above-indentified patent and that said Letters Patent is hereby corrected as shown below:

At column 7, line 30, between the words "input" and "of" insert --124--.

At column 10, line 19, "herein" should be --wherein--.

At column 10, line 24, "input" should be --inputs--.

Signed and Sealed this

Twelfth Day of April, 1994

Attest:

BRUCE LEHMAN

*Commissioner of Patents and Trademarks*

*Attesting Officer*